(12) United States Patent
Lin et al.

(10) Patent No.: US 11,042,033 B2
(45) Date of Patent: Jun. 22, 2021

(54) VIRTUAL REALITY GLASSES, LENS BARREL ADJUSTMENT METHOD AND DEVICE

(71) Applicant: Tencent Technology (Shenzhen) Company Limited, Shenzhen (CN)

(72) Inventors: Mingtian Lin, Shenzhen (CN); Chihwei Tsai, Shenzhen (CN); Zhixiong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/439,492

(22) Filed: Jun. 12, 2019

(65) Prior Publication Data
US 2019/0293942 A1    Sep. 26, 2019

Related U.S. Application Data

(63) Continuation of application No. PCT/CN2018/079132, filed on Mar. 15, 2018.

(30) Foreign Application Priority Data

Mar. 30, 2017 (CN) .......................... 201710200026.4

(51) Int. Cl.
   *G02B 27/01*    (2006.01)
   *G02B 7/02*    (2021.01)
   *G06K 9/00*    (2006.01)

(52) U.S. Cl.
   CPC ......... *G02B 27/0172* (2013.01); *G02B 7/023* (2013.01); *G02B 27/01* (2013.01); *G06K 9/00671* (2013.01)

(58) Field of Classification Search
   CPC ............ G02B 27/0093; G02B 27/0172; G02B 2027/0178; G02B 2027/0138; G02B 2027/014; H04N 5/33
   See application file for complete search history.

(56) References Cited

U.S. PATENT DOCUMENTS 5,572,361 A * 11/1996 Kamiya ................... G02B 7/08
                                                       359/407
8,487,228 B2 * 7/2013 Nunnink .................. G02B 3/14
                                                       250/201.2
(Continued)

FOREIGN PATENT DOCUMENTS

CN         2689284 Y        3/2005
CN       101206296 A        6/2008
(Continued)

OTHER PUBLICATIONS

Tencent Technology, ISRWO, PCT/CN2018/079132, May 30, 2018, 8 pgs.
(Continued)

*Primary Examiner* — Chad M Dicke
(74) *Attorney, Agent, or Firm* — Morgan, Lewis & Bockius LLP

(57) ABSTRACT

This application discloses virtual reality (VR) glasses, and a lens barrel adjustment method and apparatus, and relates to the field of VR technologies. The VR glasses includes a glasses body and two lens barrels that are symmetrically disposed within the glasses body. Each of the two lens barrels includes a lens barrel body and a lens barrel kit. The lens barrel kit is provided with a first adjustment component. The lens barrel body is provided with a second adjustment component. The lens barrel kit and the lens barrel body are configured to perform relative movement through coordination of the first adjustment component and the second adjustment component.

19 Claims, 6 Drawing Sheets

(56) References Cited

U.S. PATENT DOCUMENTS

| | | | |
|---|---|---|---|
| 8,847,988 B2* | 9/2014 | Geisner | A63F 13/216 |
| | | | 345/633 |
| 9,488,757 B2* | 11/2016 | Mukawa | G02B 3/12 |
| 10,007,118 B2* | 6/2018 | Border | G02B 27/017 |
| 10,025,060 B2* | 7/2018 | Lanman | G02B 7/287 |
| 10,027,879 B2* | 7/2018 | Passarella | H04N 5/2254 |
| 10,075,685 B1* | 9/2018 | Fulghum | H04N 9/3182 |
| 10,162,412 B2* | 12/2018 | Nishizawa | G06F 3/013 |
| 10,228,566 B2* | 3/2019 | von und zu Liechtenstein | |
| | | | G02B 13/14 |
| 10,241,569 B2* | 3/2019 | Lanman | G06T 5/002 |
| 10,429,647 B2* | 10/2019 | Gollier | G06F 3/013 |
| 2006/0061890 A1* | 3/2006 | Otaka | H04N 5/2254 |
| | | | 359/824 |
| 2007/0098380 A1* | 5/2007 | Spielberg | H04N 5/23212 |
| | | | 396/50 |
| 2012/0236030 A1 | 9/2012 | Border et al. | |
| 2013/0050833 A1* | 2/2013 | Lewis | A61B 3/111 |
| | | | 359/630 |
| 2013/0083003 A1* | 4/2013 | Perez | A63B 24/0062 |
| | | | 345/419 |
| 2013/0176533 A1* | 7/2013 | Raffle | G06K 9/2036 |
| | | | 351/209 |
| 2015/0138232 A1* | 5/2015 | Sugimoto | H04N 1/00408 |
| | | | 345/633 |
| 2015/0187115 A1* | 7/2015 | MacDonald | G06F 3/013 |
| | | | 345/419 |
| 2016/0133052 A1* | 5/2016 | Choi | G06F 3/011 |
| | | | 345/633 |
| 2016/0191759 A1* | 6/2016 | Somanath | H04N 13/246 |
| | | | 348/349 |
| 2016/0261841 A1* | 9/2016 | Mathew | A63F 13/533 |
| 2016/0320586 A1* | 11/2016 | Moon | G03B 3/10 |
| 2016/0320623 A1* | 11/2016 | Miyao | H04N 13/344 |
| 2017/0104903 A1* | 4/2017 | Warashina | G02B 13/0085 |
| 2017/0160518 A1* | 6/2017 | Lanman | G06T 19/006 |
| 2017/0160798 A1* | 6/2017 | Lanman | G02B 27/0172 |
| 2017/0161951 A1* | 6/2017 | Fix | G06T 5/00 |
| 2017/0262054 A1* | 9/2017 | Lanman | G02B 27/0068 |
| 2018/0003919 A1* | 1/2018 | Song | G06K 9/0061 |
| 2018/0275367 A1* | 9/2018 | Lim | G02B 25/004 |
| 2019/0041643 A1* | 2/2019 | Chang | H04N 13/122 |
| 2019/0064526 A1* | 2/2019 | Connor | G02B 6/0073 |
| 2019/0258061 A1* | 8/2019 | Solomon | G02B 27/0176 |
| 2019/0331922 A1* | 10/2019 | Kim | G02B 26/0833 |
| 2019/0346918 A1* | 11/2019 | Akkaya | G02B 27/0075 |
| 2020/0051320 A1* | 2/2020 | Laffont | G02B 27/0172 |
| 2020/0082631 A1* | 3/2020 | Yoon | G06Q 50/10 |

FOREIGN PATENT DOCUMENTS

| | | |
|---|---|---|
| CN | 201247347 Y | 5/2009 |
| CN | 104914582 A | 9/2015 |
| CN | 104932103 A | 9/2015 |
| CN | 204832687 U | 12/2015 |
| CN | 205038406 U | 2/2016 |
| CN | 105425397 A | 3/2016 |
| CN | 105980921 A | 9/2016 |
| CN | 205665466 U | 10/2016 |

OTHER PUBLICATIONS

Tencent Technology, IPRP, PCT/CN2018/079132, Oct. 1, 2019, 6 pgs.

* cited by examiner

VIRTUAL REALITY GLASSES, LENS BARREL ADJUSTMENT METHOD AND DEVICE

CROSS-REFERENCE TO RELATED APPLICATIONS

This application is a continuation application of PCT/CN2018/079132, entitled "VIRTUAL REALITY GLASSES, AND LENS BARREL ADJUSTMENT METHOD AND APPARATUS" filed on Mar. 15, 2018, which claims priority to Chinese Patent Application No. 201710200026.4, entitled "VIRTUAL REALITY GLASSES, AND LENS BARREL ADJUSTMENT METHOD AND APPARATUS" filed with the Chinese Patent Office on Mar. 30, 2017, all of which are incorporated by reference in their entirety.

FIELD OF THE TECHNOLOGY

This application relates to the field of virtual reality (VR) technologies, and in particular, to VR glasses, and a lens barrel adjustment method and apparatus.

BACKGROUND OF THE DISCLOSURE

With the development of VR technologies, the emergence of VR glasses enables users to conveniently view video images with three-dimensional (3D) stereoscopic effects. VR glasses includes two lens barrels, and each lens barrel includes a lens and a display. A left eye of a human can see, through a lens of a left lens barrel, a left virtual image of an image displayed by the display. A right eye of the human can see, through a lens of a right lens barrel, a right virtual image of the image displayed by the display. When an imaging distance between an imaging position of the left virtual image and the eye of the human is the same as an imaging distance between an imaging position of the right virtual image and the eye of the human, the left virtual image coincides with the right virtual image. When the eyes of the human view an image in a coincidence area, the brain may synthesize a stereoscopic image, so that the user can view a clear 3D video image in a virtual image mixing area.

SUMMARY

To resolve a problem in the existing technology, embodiments of this application provide VR glasses, and a lens barrel adjustment method and apparatus.

According to a first aspect of the present disclosure, VR glasses in the embodiments may include:

a glasses body and two lens barrels that are symmetrically disposed within the glasses body, each of the two lens barrels including a lens barrel body and a lens barrel kit, the lens barrel kit being provided with a first adjustment component, and the lens barrel body being provided with a second adjustment component; and wherein the lens barrel kit and the lens barrel body is configured to perform relative movement through coordination of the first adjustment component and the second adjustment component.

According to a second aspect of the present disclosure, a lens barrel adjustment method in the embodiments is applicable to VR glasses having a glasses body and two lens barrels that are symmetrically disposed within the glasses body. Each lens barrel of the VR glasses includes a lens barrel body and a lens barrel kit. A lens and a display are respectively disposed at opposite ends of the lens barrel body and lens barrel kit. The lens barrel kit is provided with a first adjustment component. The lens barrel body is provided with a second adjustment component. The lens barrel kit and the lens barrel body are capable of performing relative movement through coordination of the first adjustment component and the second adjustment component. The method may include:

determining, based on a scene type of a to-be-displayed image, a target distance between a display and a lens that correspond to each lens barrel;

obtaining a current distance between the display and the lens that correspond to each lens barrel; and in accordance with a determination that the current distance is not the same as the target distance, adjusting the first adjustment component and the second adjustment component to achieve the target distance between the display and the lens.

According to a third aspect of the present disclosure, a lens barrel adjustment apparatus in the embodiments is applicable to VR glasses having a glasses body and two lens barrels that are symmetrically disposed within the glasses body. Each lens barrel of the VR glasses includes a lens barrel body and a lens barrel kit. A lens and a display are respectively disposed at opposite ends of the lens barrel body and the lens barrel kit. The lens barrel kit is provided with a first adjustment component. The lens barrel body is provided with a second adjustment component. The lens barrel kit and the lens barrel body are capable of performing relative movement through coordination of the first adjustment component and the second adjustment component. The apparatus is configured to perform the aforementioned lens barrel adjustment method.

An inner wall of the lens barrel kit is provided with the first adjustment component, and an outer wall of the lens barrel body is provided with the second adjustment component. Based on coordination of adjustment of the first adjustment component and the second adjustment component, the lens barrel body and the lens barrel kit may perform relative movement, to change the distance between the lens and the display of the lens barrel, that is, an imaging distance can be adaptively changed, so that the VR glasses is applicable to a plurality of scenarios, thereby improving practicality of the VR glasses.

BRIEF DESCRIPTION OF THE DRAWINGS

To describe the technical solutions in embodiments of this application clearer, the following briefly describes the accompanying drawings required for describing the embodiments. The accompanying drawings in the following description show merely some embodiments of this application, and a person of ordinary skill in the art may still derive other drawings from these accompanying drawings without creative efforts.

DESCRIPTION OF EMBODIMENTS

Figure 1:
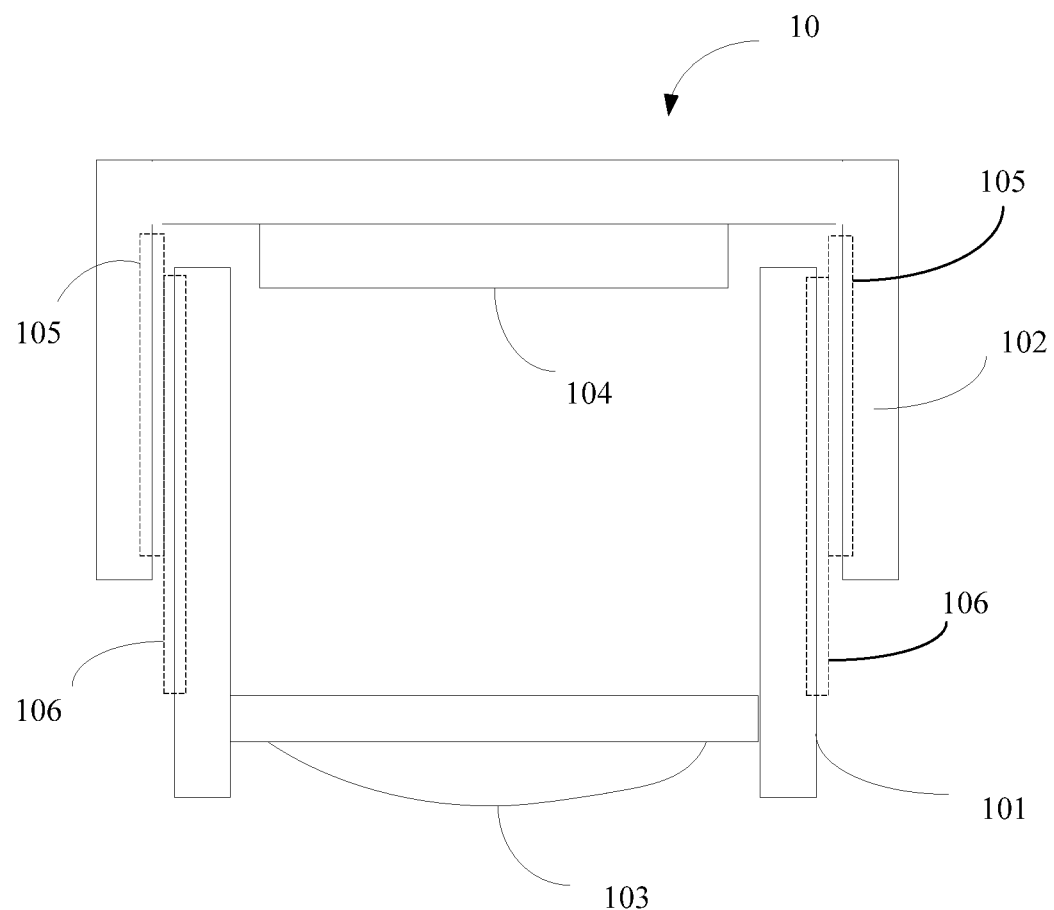
FIG. 1 is a cross sectional schematic view of a lens barrel according to an embodiment of this application.

To make objectives, technical solutions, and advantages of this application clearer, the following further describes in detail implementations of this application with reference to the accompanying drawings.

During actual application, a user may use VR glasses in different application scenarios. Sometimes, the VR glasses needs to be used in a short range, for example, when a table game is played in virtual space displayed by the VR glasses, a distance between a virtual image mixing area and a human eye needs to fall within an approximate range of 0.5 meter (m) to 0.8 m. Sometimes, the VR glasses needs to be used in a medium range, for example, when a social activity is conducted in virtual space, a distance between a virtual image mixing area and a human eye needs to fall within an approximate range of 1.5 m to 3 m. Sometimes, the VR glasses needs to be used in a long range, for example, when a shooting game is played or a 3D movie is watched in virtual space, a distance between a virtual image mixing area and a human eye needs to be larger than or equal to 5 m approximately.

The virtual image mixing area is an area in which a user can see a clear image. That is, when a formed virtual image is in the area, the user can see a clear 3D image. A distance range corresponding to the virtual image mixing area is determined by an imaging distance between the human eye and a virtual image. Based on the imaging principle of the VR glasses, the imaging distance between the human eye and a position of the virtual image is very easily affected by a distance between a lens and a display. Assuming that the distance between the lens and the display is referred to as an object distance, a change in the object distance causes a change in the imaging distance. Table 1 shows a common correspondence between an imaging distance, a distance between a virtual image mixing area and a human eye, and an application scenario.

TABLE 1

| Imaging distance (unit: m) | Distance from a virtual image mixing area (unit: m) | Application scenario |
| --- | --- | --- |
| 1.0 | 0.67 to 2.0 | Short-range scenario, such as a table game |
| 1.5 | 0.85 to 6.0 | Medium-range scenario, such as a social activity |
| 2.0 | 1.0 to infinity | Long-range scenario, such as a 3D movie and a shooting game |

To apply VR glasses to a plurality of application scenarios, for VR glasses provided in the embodiments of this application, an object distance between a lens and a display can be adjusted. The VR glasses provided in the embodiments of this application includes a glasses body. The glasses body includes two lens barrels that are symmetrically disposed. Each of the two lens barrels includes a lens barrel body and a lens barrel kit. A first surface of the lens barrel kit is provided with a first adjustment component. A second surface of the lens barrel body is provided with a second adjustment component. The lens barrel kit and the lens barrel body are capable of performing relative movement through coordination of the first adjustment component and the second adjustment component. The first surface may be an inner wall or an outer wall. The second surface may be an outer wall or an inner wall.

For example, referring to a cross sectional schematic view of the lens barrel shown in FIG. 1, the glasses body includes two lens barrels 10 that are symmetrically disposed. Each lens barrel 10 includes a lens barrel body 101 and a lens barrel kit 102. A first end of the lens barrel body 101 is provided with a lens 103, and a second end of the lens barrel body 101 is embedded into the lens barrel kit 102. One end of the lens barrel kit 102 away from the first end of the lens barrel body 101 is provided with a display 104. That is, the lens and the display are respectively disposed at opposite ends of the lens barrel body 101 and the lens barrel kit 102.

An inner wall of the lens barrel kit 102 is provided with a first adjustment component 105. An outer wall of the lens barrel body 101 is provided with a second adjustment component. The lens barrel kit 102 and the lens barrel body 101 are capable of performing relative movement through coordination of the first adjustment component 105 and the second adjustment component 106.

The first adjustment component and the second adjustment component are disposed, so that the lens barrel kit and the lens barrel body are capable of performing relative movement. In the embodiments, for the VR glasses, a distance between a virtual image mixing area and a human eye can be adjusted, thereby achieving a good imaging effect in different application scenarios.

Figure 2A:
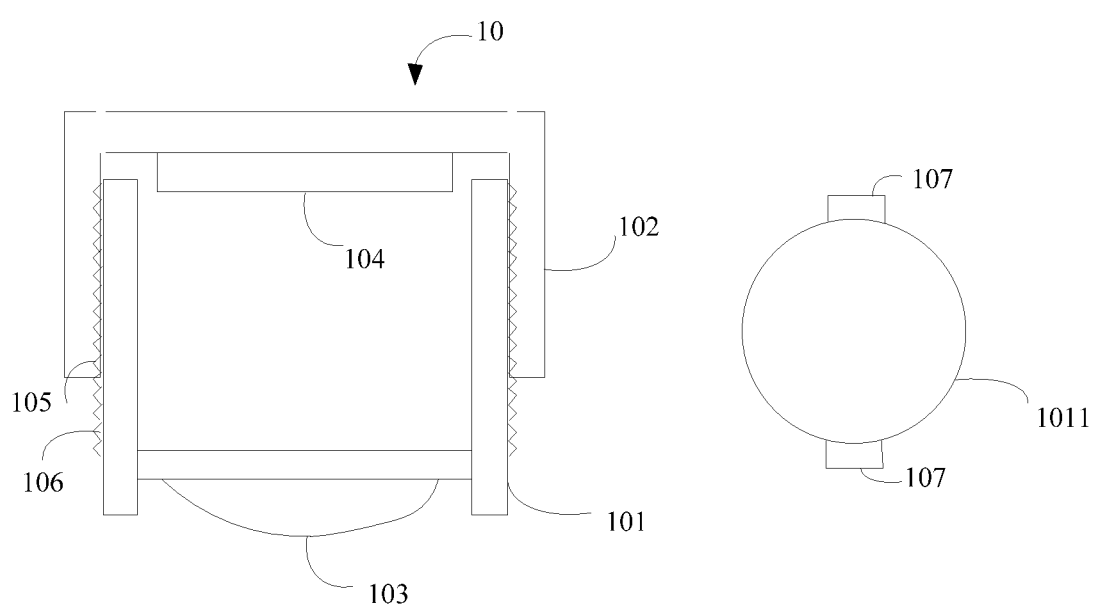
FIG. 2A is a cross sectional schematic view of a lens barrel according to an embodiment of this application.
Figure 2B:
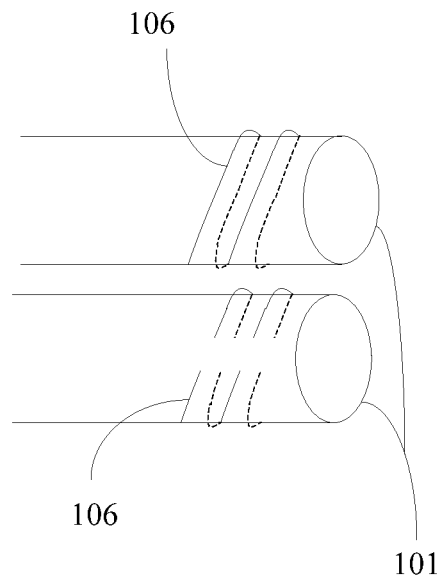
FIG. 2B is a schematic diagram of a thread of a lens barrel body according to an embodiment of this application.

Referring to a cross sectional schematic view of the lens barrel 10 shown in FIG. 2A, the first adjustment component 105 may have a female thread structure, the second adjustment component 106 may have a male thread structure, and the female thread structure and the male thread structure can be mutually engaged. FIG. 2A is a sectional view showing that the first adjustment component and the second adjustment component are mutually engaged. For example, the first adjustment component 105 may have a female thread structure encircling the inner wall of the lens barrel kit 102, and the second adjustment component 106 may have a female thread structure encircling the outer wall of the lens barrel body 101. On the premise of ensuring that the lens barrel kit 102 and the lens barrel body 101 are capable of performing relative movement, an encirclement manner in which the first adjustment component 105 encircles the lens barrel kit 102, or the second adjustment component 106 encircles the lens barrel body 101 may be overall encirclement or partial encirclement. For example, in a schematic diagram of a thread of the lens barrel body shown in FIG. 2B, an example in which the second adjustment component 106 encircles the lens barrel body 101 is used for respectively providing schematic diagrams of overall encirclement (an upper figure) and partial encirclement (a lower figure).

During actual application, a user may rotate the lens barrel body 101 or the lens barrel kit 102 to change a distance between the lens barrel body 101 and the lens barrel kit 102, to adjust the distance between the lens and the display. For example, when the thread is a right-hand thread, if the user rotates the lens barrel body clockwise, the lens barrel body may move toward a direction close to the lens barrel kit along the thread, to reduce the distance between the lens and the display; or if the user rotates the lens barrel body in a reverse direction, the lens barrel may move toward a direction away from the lens barrel kit along the thread, to increase the distance between the lens and the display. To facilitate rotation by the user, an example of rotating the lens barrel body 101 is used. An outer wall of the first end of the lens barrel body 101 may be provided with a pair of protruding rotation assisting members 107. For example, in a cross section 1011 of the lens barrel body shown in FIG. 2A, the rotation assisting member 107 may be a square protrusion or a cylindrical protrusion. A shape and a size of the rotation assisting member are not limited in the embodiments of this application.

It should be noted that, to improve adjustment accuracy, the first adjustment component and the second adjustment component are further provided with a plurality of levels through coordination. For example, different levels may be provided based on different types of application scenarios, and different levels are used for indicating relative movement of the lens barrel body 101 and the lens barrel kit 102 by different distances. That is, the different levels are used for indicating different distances between the lens and the display, so that the VR glasses can correspond to the different types of application scenarios. A clear stereoscopic image is displayed in a virtual image mixing area required by a corresponding type of application scenario. For example, the plurality of levels may be provided in the following manner: A plurality of annular level indication lines is sprayed on the second adjustment component, and different level indication lines are used for indicating different levels. For example, when a level indication line is aligned with a second end of the lens barrel kit, it indicates that currently, it is at a level corresponding to the level indication line. Correspondingly, application scenarios corresponding to different level indication lines may be described in an operating manual of the VR glasses. The different level indication lines may be sprayed with same or different colors.

Figure 3:
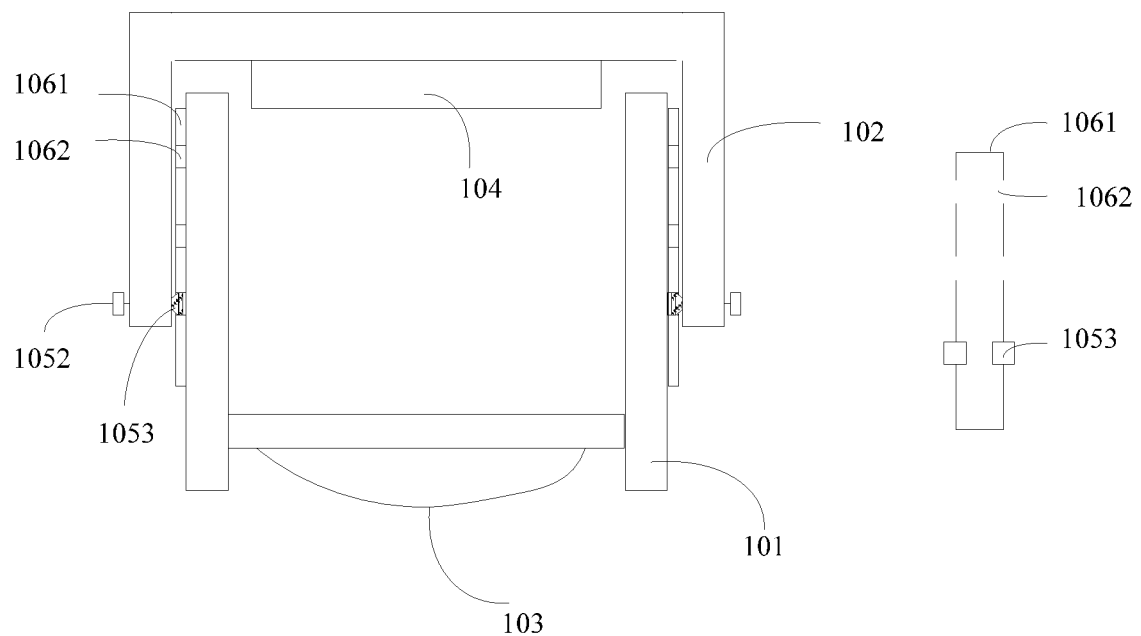
FIG. 3 is a cross sectional schematic view of a lens barrel according to an embodiment of this application.

Refer to a cross sectional schematic view of the lens barrel 10 shown in FIG. 3. FIG. 3 is a sectional view of coordinated use of the first adjustment component and the second adjustment component. The first adjustment component 105 includes a pair of elastic clamping tenons 1051 that are symmetrically disposed. Each elastic clamping tenon 1051 includes a pressing portion 1052 and an elastic latching portion 1053. The elastic latching portion 1053 extends out toward the inner wall of the lens barrel kit 102. The pressing portion 1052 extends out toward an outer wall of the lens barrel kit 102. The second adjustment component 106 includes a pair of clamping tracks 1061. Each clamping track 1061 corresponds to one elastic clamping tenon 1051 and it is disposed along an axial direction of the lens barrel body. Each clamping track 1061 is provided with a plurality of pairs of clamping slots 1062 along a radial direction of a cross section of the lens barrel body. Each pair of clamping slots 1062 is used for accommodating the elastic latching portion 1053 of the elastic clamping tenon 1051.

The elastic latching portion 1053 may include two squeezable sheet-like structures. The two sheet-like structures are disposed at one end away from the pressing portion 1052, and extend toward a reverse direction. A right figure in FIG. 3 is a schematic diagram showing that extending parts of the two sheet-like structures of the elastic latching portion 1053 are clamped in the clamping slots from a perspective of a top view from the front of the clamping slots. When no external pressure is applied to the pressing portion 1052, a maximum distance D1 between the two sheet-like structures of the elastic latching portion 1053 is slightly greater than a width D2 of an inner wall of the clamping track 1061, so that when the clamping slot 1062 accommodates the elastic latching portion 1053, the elastic latching portion 1053 protrudes from an outer wall of the clamping track, to implement fixing. When an external pressure is applied to the pressing portion 1052, the two sheet-like structures of the elastic latching portion 1053 are approaching each other, so that the maximum distance between the two sheet-like structures is reduced to D3, and D3 is less than D2, so that the elastic clamping tenon 1051 can slide along the clamping track 1061.

It should be noted that, each pair of clamping slots 1062 on the clamping track 1061 corresponds to one level. For example, different levels may be provided based on different types of application scenarios, and the different levels are used for indicating different distances between the lens and the display.

During actual application, for each lens barrel, the user may apply external pressure to, for example, press or squeeze, a pair of pressing portions 1052 simultaneously, so that the elastic latching portion 1053 is detached from the clamping slot 1062; further, the user may move the lens barrel body 101 or the lens barrel kit 102, to change the distance between the lens and the display. For example, as shown in FIG. 3, the current elastic latching portion 1053 is clamped in the first clamping slot at a lower part, and when the elastic latching portion 1053 is detached from the clamping slot 1062, the user may pull the lens barrel body outward, and the elastic latching portion 1053 is clamped in a clamping slot in the middle, to increase the distance between the lens and the display. To facilitate an operation of the user, if the two lens barrels are respectively referred to as a left lens barrel and a right lens barrel, the pair of elastic clamping tenons 1051 may be disposed at positions that are vertically symmetrical on the inner wall of the lens barrel kit 102, and correspondingly, the pair of clamping tracks 1061 are also symmetrically disposed at positions that are vertically symmetrical on the outer wall of the lens barrel body 101.

Figure 4A:
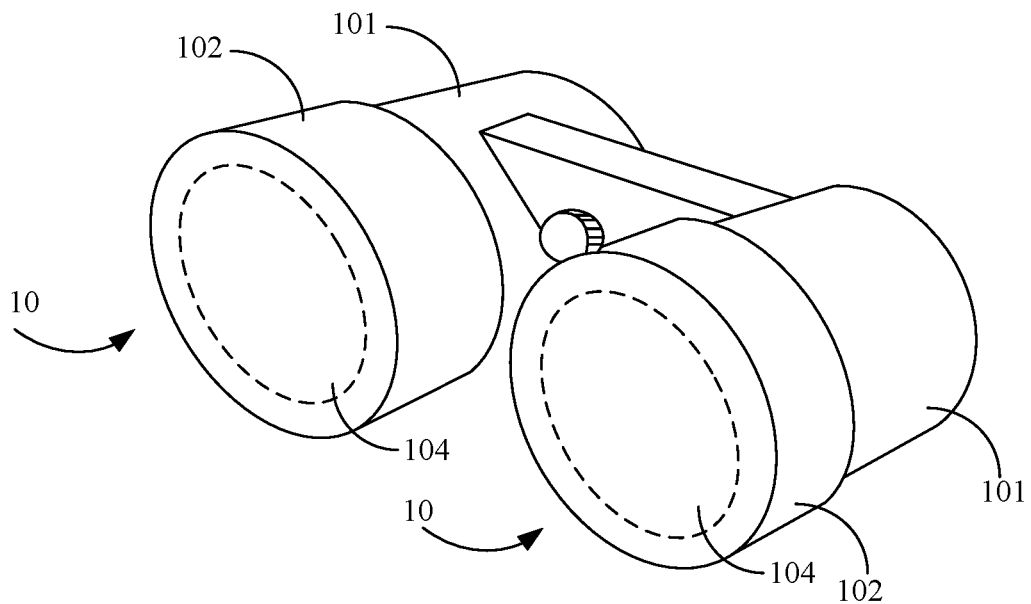
FIG. 4A is a pair of VR glasses, in accordance of some embodiments.
Figure 4B:
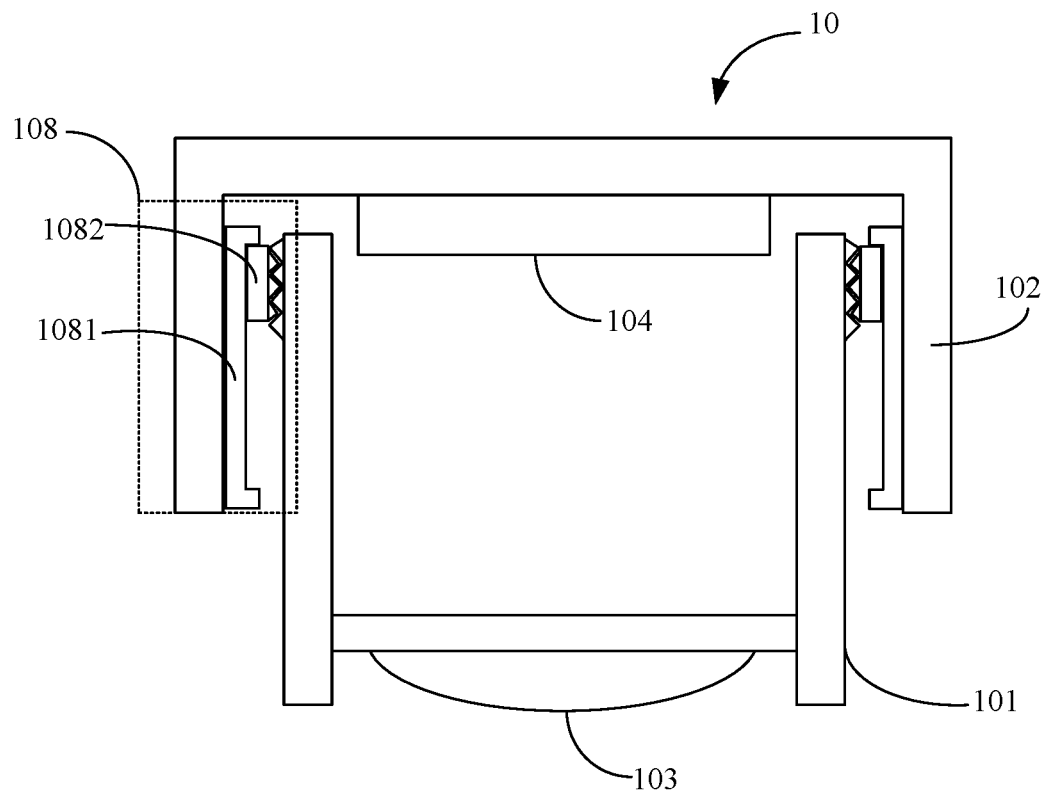
FIG. 4B is a cross sectional schematic view of a lens barrel of the VR glasses in FIG. 4A according to an embodiment of this application.

FIG. 4A is a pair of VR glasses, in accordance with some embodiments. Referring to cross sectional schematic views of the lens barrel 10 shown in FIG. 4B and FIG. 5, the first adjustment component 105 and the second adjustment component 106 form a motor 108. The first adjustment component 105 is a stator assembly 1081 of the motor, and the second adjustment component 106 is a rotor assembly 1082 of the motor. Such a structure including the motor may be designed in the following two manners:

In a first manner, referring to FIG. 4B, the motor 108 includes two pairs of stator assemblies 1081 and rotor assemblies 1082. The two pairs of stator assemblies and rotor assemblies may be symmetrically disposed. A stator assembly and a rotor assembly in each pair is used in coordination. The stator assembly 1081 includes a slide guide. The slide guide may have a rod-shaped structure, a tape-shaped structure, or the like. A first end of the rotor assembly 1082 is fixed on the inner wall of the lens barrel body 101. For example, the first end of the rotor assembly 1082 and the inner wall of the lens barrel body 101 may be fixed by using thread structures that are mutually engaged or fixed by using toothed structures that are mutually engaged. This is not limited in this embodiment. A second end of the rotor assembly 1082 is slidably connected to the slide guide of the stator assembly 1081, so that during working, the motor may drive the rotor assembly 1082 to move along the slide guide. Because the rotor assembly 1082 is fixed on the lens barrel body 101, when the rotor assembly 1082 moves along the slide guide, the lens barrel body 101 may be driven to move. For example, when the motor pushes the lens barrel body outward (a lower part in the figure), the distance between the lens and the display may be increased; otherwise, the distance between the lens and the display may be reduced.

The motor 108 may be a step motor. During design, different levels may be provided for the motor 108. For example, different levels may be provided based on different types of application scenarios, and the different levels are used for indicating different distances between the lens and the display. When the motor 108 is controlled to move the lens barrel body 101, a target level may be determined based on a target distance between the lens and the display, to control the rotor assembly 1081 of the motor 108 to move to the target level. For a detailed process, refer to a lens barrel adjustment method provided in FIG. 6.

It should be noted that, when the lens barrel body is sufficiently light, the motor 108 may alternatively include only a stator assembly and a rotor assembly that are paired. In this case, the stator assembly and the rotor assembly that are paired can support the lens barrel body, and a driving force of the motor is sufficient for pushing the lens barrel body to move.

Figure 5:
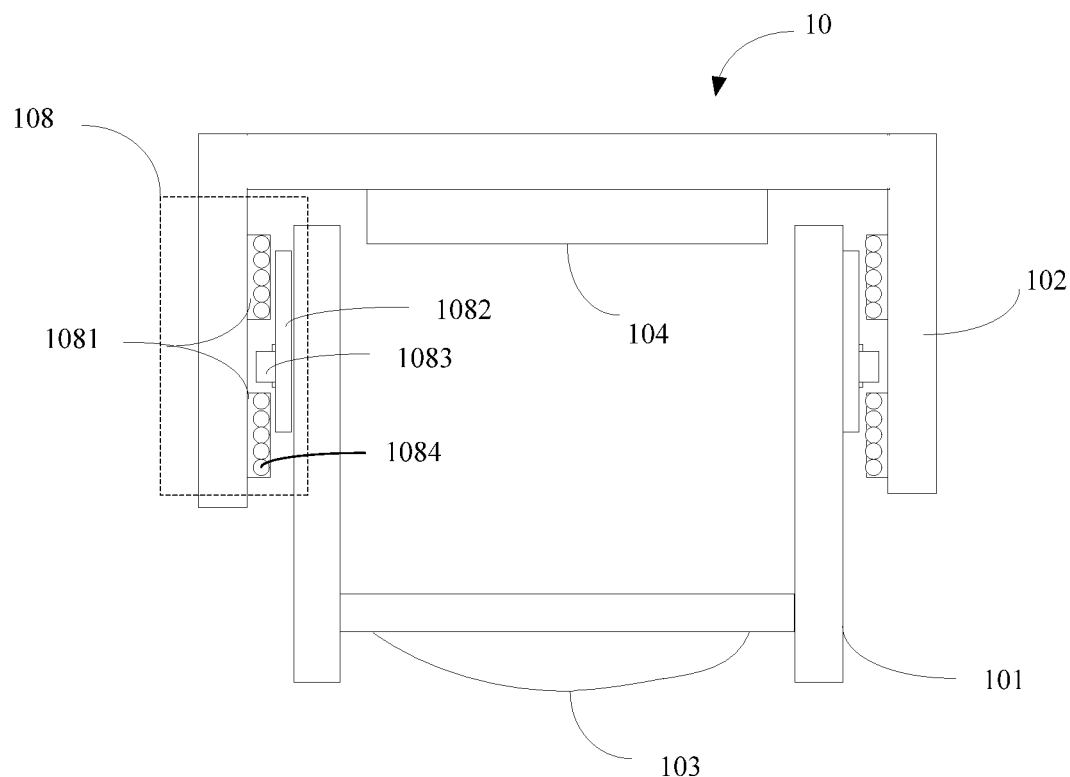
FIG. 5 is a cross sectional schematic view of a lens barrel according to an embodiment of this application.

In a second manner, referring to FIG. 5, the stator assembly 1081 of the motor 108 is an annular stator assembly, and the rotor assembly 1082 is an annular rotor assembly. The rotor assembly 1082 includes a fixing portion and an annular magnet. An inner wall of the fixing portion is fixed on the outer wall of the lens barrel body 101. The outer wall of the fixing portion is fixed with an annular magnet 1083. The stator assembly 1081 includes an upper coil accommodation structure and a lower coil accommodation structure. Each coil accommodation structure is accommodated with a coil 1084. An annular space of a particular width is reserved between the upper coil accommodation structure and the lower coil accommodation structure. The width of the annular space is greater than a width of the annular magnet, so that the annular magnet can move in the annular space. Leads of two coils of the stator assembly 1081 are both connected to a power supply of the VR glasses (not shown).

When the motor 108 works, the two coils generate magnetic fields in reverse directions, and the two magnetic fields interact to push the annular magnet and the lens barrel body 101 to move. When the magnet moves upward to abut against a lower edge of the upper coil accommodation structure, the distance between the lens and the display is a first distance. When the magnet moves downward to abut against an upper edge of the lower coil accommodation structure, the distance between the lens and the display is a second distance. The first distance and the second distance may be considered as two levels. The first distance is less than the second distance. When the motor 108 is controlled to move the lens barrel body 101, the target level may be determined based on the target distance between the lens and the display, to control the rotor assembly 1081 of the motor 108 to move to the target level. For a detailed process, refer to the lens barrel adjustment method provided in FIG. 6.

It should be noted that, in the foregoing two manners, to more accurately move the lens barrel, a positioning apparatus may be further disposed in coordination with the first adjustment component and the second adjustment component (namely, the motor). The positioning apparatus is configured to detect a distance of relative movement between the lens barrel body 101 and the lens barrel kit 102. For example, the positioning apparatus may be a displacement sensor. The displacement sensor includes a sliding portion and a fixing portion. The sliding portion may be fixed on the rotor assembly 1082, so that the sliding portion can move along with the rotor assembly 1082. Corresponding to the sliding portion, the fixing portion may be fixed on the stator assembly 1081. For the first manner, corresponding to the sliding portion, the fixing portion of the displacement sensor may alternatively be fixed on the inner wall of the lens barrel kit, and may be determined based on a position of the sliding portion. Similarly, corresponding to the first manner, the positioning apparatus may be disposed corresponding to a stator assembly and a rotor assembly that are paired.

In this embodiment of this application, to improve a feeling of immersion of the user when using the VR glasses, the second end of the lens barrel body 101 of each lens barrel 10 may be further provided with an annular light shielding structure. The annular light shielding structure is in contact with the inner wall of the lens barrel kit 102. The annular light shielding structure is disposed to ensure that external light cannot enter the lens barrel, so that the interior of the lens barrel is in a completely dark state, to improve a feeling of immersion of the user when viewing a video by using the VR glasses. In addition, the annular light shielding structure is disposed to further implement dust prevention. It should be noted that, when the thread structure shown in FIG. 3 is a thread structure for overall encirclement, because of tightness of engagement of the thread structure, light shielding and dust prevention can be implemented. Therefore, the annular light shielding structure may not be disposed.

It should be noted that, when the lens barrel is adjusted, the two lens barrels need to be adjusted to the same position, so that the distances between the lenses and the displays of the two lens barrels are equal. For the structures shown in FIG. 4B and FIG. 5, the VR glasses can control the motor to work and control the rotor assemblies of the motor to move by the same distance.

For the VR glasses provided in this embodiment of this application, the lens barrel kit is provided with the first adjustment component, and the lens barrel body is provided with the second adjustment component. Based on coordination of adjustment of the first adjustment component and the second adjustment component, the lens barrel body and the lens barrel kit may perform relative movement, to change the distance between the lens and the display of the lens barrel, that is, an imaging distance can be adaptively changed, so that the VR glasses is applicable to a plurality of scenarios, thereby improving practicality of the VR glasses.

Figure 6:
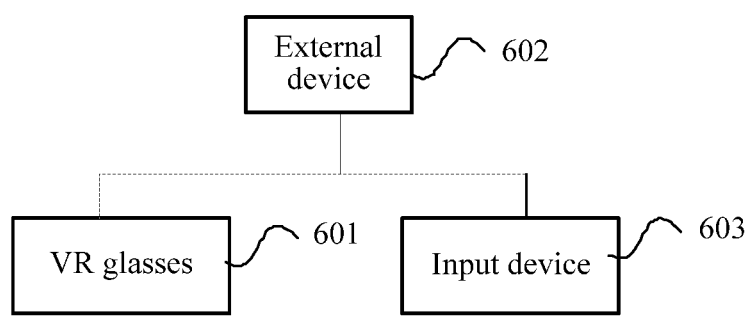
FIG. 6 is a schematic diagram of a connection relationship of a VR device according to an embodiment of this application.

FIG. 6 is a schematic diagram of a connection relationship of a VR device according to an embodiment of this application. As shown in FIG. 6, VR glasses 601 is connected to an external device 602. The connection may be a wired connection or a wireless connection. The VR glasses 601 may be connected to an input device 603. The connection may be a direct connection, or may be an indirect connection through the external device 602. The external device 602 is connected to the VR glasses 601 and the input device 603. The external device 602 may be various devices providing VR images, for example, a movie box providing a movie resource or a game box providing a game resource. The VR glasses 601 is also referred to as a VR head-mounted device, configured to provide a user with a VR image, a display setting option, and the like. The input device 603 is configured to sense a user input or a state, and provide sensed information to the external device 602 for processing. The input device 603 may be various interaction devices, for example, a position tracker, a data glove, a 3D input device (such as a 3D mouse), an action capturing device, an eye tracker, a force feedback device, and another interaction device.

In some embodiments, the VR glasses 601 may include a lens barrel adjustment apparatus. The lens barrel adjustment apparatus may obtain a scene type of a to-be-displayed image, determine, based on the scene type, a target distance between a display and a lens that correspond to each lens barrel, and control a first adjustment component and a second adjustment component to adjust a distance between the display and the lens to reach the target distance.

Figure 7:
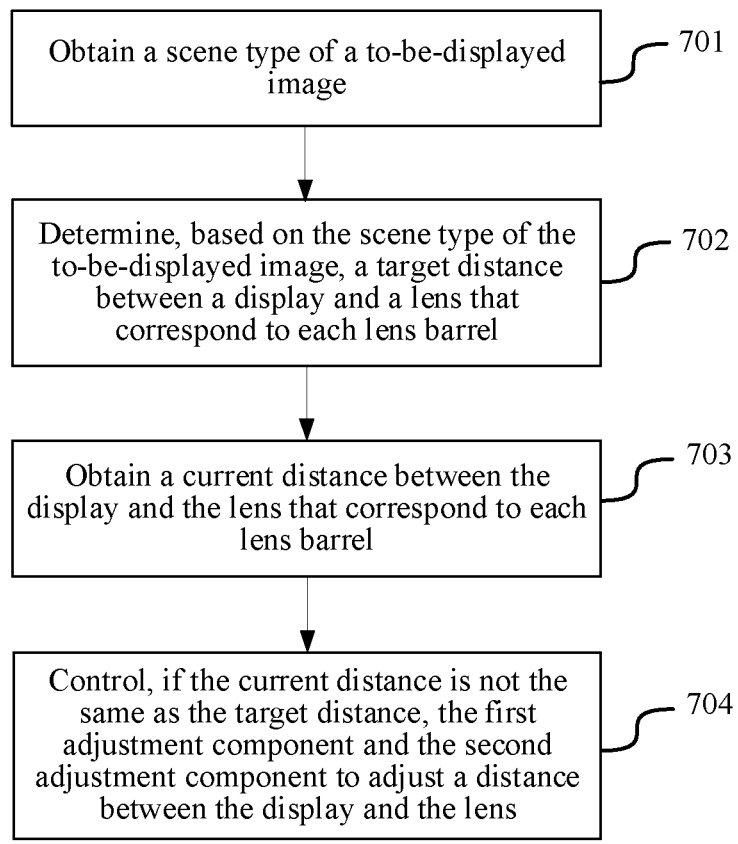
FIG. 7 is a flowchart of a lens barrel adjustment method according to an embodiment of this application.

FIG. 7 shows a lens barrel adjustment method according to an embodiment of this application. The method is applied to VR glasses. The method includes the following steps:

701: Obtain a type of a to-be-displayed image.

In this embodiment of this application, the VR glasses may automatically detect a current scene type.

In an example, the scene type of the to-be-displayed image may be obtained through a scene type option of the VR glasses. For example, the VR glasses may be provided with a plurality of scene type options. For example, the scene type option may include a 3D movie, a table game, a shooting game, or the like. A user may select an actually applied scene type according to a requirement of the user. When detecting that a corresponding scene type option is in a selected state, the VR glasses determines that the scene type in the selected state is the scene type of the to-be-displayed image.

In an example, the scene type of the to-be-displayed image may be obtained based on a device type of an external device of the VR glasses. For example, the VR glasses may be externally connected to different types of devices, for example, a movie box providing a movie resource or a game box providing a game resource. The VR glasses obtains the device type of the external device through communication with the external device. The device type may be a resource type of the device. The VR glasses may determine the scene type of the to-be-displayed image based on the device type.

In an example, the VR glasses may receive scenario information provided by an external device. For example, the external device may send scenario information of the to-be-displayed image to the VR glasses. The VR glasses may determine the scene type of the to-be-displayed image based on the received scenario information. For example, when running a game, the external device may read required distance information from game information, or automatically identify a distance required by the game, and send the distance information as the scenario information to the VR glasses. The VR glasses may convert the received distance information into one of preset scene types based on a preset mapping relationship.

702: Determine, based on the scene type of the to-be-displayed image, a target distance between a display and a lens that correspond to each lens barrel.

In this embodiment of this application, the VR glasses may preset a correspondence between a scene type and a distance between the display and the lens. For example, a correspondence between an object distance and a scene type may be obtained based on the correspondence shown in Table 1, and a correspondence between an object distance between the display and the lens and an imaging distance, and the correspondence between an object distance and a scene type is preconfigured in the VR glasses.

When determining the scene type of the to-be-displayed image, the VR glasses may determine, in the preset correspondence between a scene type and a distance between the display and the lens, a distance corresponding to the scene type of the to-be-displayed image, as the target distance.

703: Obtain a current distance between the display and the lens that correspond to each lens barrel.

In this embodiment of this application, the VR glasses drives, through a motor, a lens barrel body and a lens barrel kit to perform relative movement. A structure of the motor is shown in FIG. 4B or FIG. 5. When the lens barrel body and the lens barrel kit are at initial positions, this configuration corresponds to an initial distance between the display and the lens. Each time the motor is controlled to move the lens barrel body, the VR glasses may determine a current movement distance of the lens barrel body based on a correspondence between a quantity of rotations of the motor and a movement distance of a rotor assembly, and obtain the current distance between the display and the lens with reference to the initial distance.

In addition, when the lens barrel is provided with a positioning apparatus in coordination with the motor, the positioning apparatus may detect the current movement distance of the lens barrel body, or an initial value of the positioning apparatus is set, so that the positioning apparatus can directly detect the current distance between the lens and the display.

704: Control, if the current distance is not the same as the target distance, the first adjustment component and the second adjustment component to adjust a distance between the display and the lens.

The process of adjusting the distance between the display and the lens may be: determining target movement displacement based on the current distance and the target distance; and controlling the first adjustment component and the second adjustment component to move the lens barrel kit or the lens barrel body by the target movement displacement.

The target movement displacement may be a difference between the current distance and the target distance. A positive value and a negative value of the target movement displacement respectively indicate different movement directions. For example, when the target movement displacement has a positive value, the lens barrel body and the lens barrel kit need to be controlled to move toward each other. When the target movement displacement has a negative value, the lens barrel body and the lens barrel kit need to be controlled to move to be away from each other.

The process of controlling the first adjustment component and the second adjustment component to move the lens barrel kit or the lens barrel body by the target movement displacement may be: determining a target level corresponding to the first adjustment component and the second adjustment component based on the target movement displacement; and setting the first adjustment component and the second adjustment component to the target level through coordination, so that the lens barrel kit or the lens barrel body is moved by the target movement displacement.

It should be noted that, if the current distance is the same as the target distance, for the VR glasses, the lens barrel is not moved.

According to the method provided in this embodiment of this application, the target distance between the lens and the display is determined based on different scene types, and the first adjustment component and the second adjustment component can be controlled to adjust a relative distance between the lens barrel body and the lens barrel kit, so that the VR glasses is applicable to a plurality of scenarios, thereby improving practicality and intelligence of the VR glasses.

Figure 8:
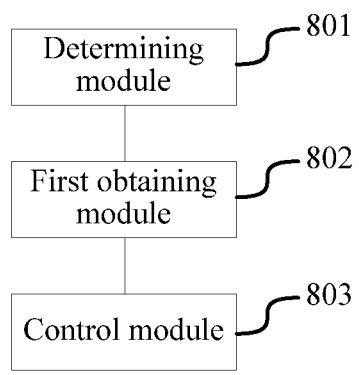
FIG. 8 is a block diagram of a lens barrel adjustment apparatus according to an embodiment of this application.

FIG. 8 is a block diagram of a lens barrel adjustment apparatus according to an embodiment of this application. The apparatus is applied to VR glasses. Each lens barrel of the VR glasses includes a lens barrel body and a lens barrel kit. A lens and a display are respectively disposed at opposite ends of the lens barrel body and the lens barrel kit. The lens barrel kit is provided with a first adjustment component. The lens barrel body is provided with a second adjustment component. Referring to FIG. 8, the apparatus includes a determining module 801, a first obtaining module 802, and a control module 803.

The determining module is configured to determine, based on a scene type of a to-be-displayed image, a target distance between a display and a lens that correspond to each lens barrel.

The first obtaining module is configured to obtain a current distance between the display and the lens that correspond to each lens barrel.

The control module is configured to control, if the current distance is not the same as the target distance, the first adjustment component and the second adjustment component to adjust a distance between the display and the lens.

In a possible implementation, the determining module is configured to determine, in a preset correspondence between a scene type and a distance between a display and a lens based on the scene type of the to-be-displayed image, a distance corresponding to the scene type of the to-be-displayed image, as the target distance.

In a possible implementation, the control module includes:

a determining unit, configured to determine target movement displacement based on the current distance and the target distance; and a control unit, configured to control the first adjustment component and the second adjustment component to move the lens barrel kit or the lens barrel body by the target movement displacement.

In a possible implementation, the control unit is configured to:

determine a target level of the first adjustment component and the second adjustment component based on the target movement displacement; and set the first adjustment component and the second adjustment component to the target level through coordination, so that the lens barrel kit or the lens barrel body is moved by the target movement displacement.

In a possible implementation, the apparatus further includes:

a second obtaining module, configured to obtain the scene type of the to-be-displayed image through a scene type option of the VR glasses; or a third obtaining module, configured to obtain a device type of an external device of the VR glasses, and obtain the scene type of the to-be-displayed image based on the device type; or a fourth obtaining module, configured to obtain scenario information provided by an external device of the VR glasses, and determine the scene type based on the scenario information.

The apparatus provided in this embodiment determines the target distance between the lens and the display based on different scene types, and can control the first adjustment component and the second adjustment component to adjust a relative distance between the lens barrel body and the lens barrel kit, so that the VR glasses is applicable to a plurality of scenarios, thereby improving practicality and intelligence of the VR glasses.

It should be noted that, when the lens barrel adjustment apparatus provided in the foregoing embodiment adjusts the lens barrel, division of the foregoing functional modules is merely used as an example for description, and during actual application, the foregoing functions may be accomplished by different functional modules as required, that is, the internal structure of the device is divided into different functional modules, to accomplish all or some of the functions described above. In addition, the lens barrel adjustment apparatus provided in the foregoing embodiment belongs to the same concept as the lens barrel adjustment method embodiment, and for a specific implementation process of the apparatus, refer to the method embodiment, and details are not described herein again.

Figure 9:
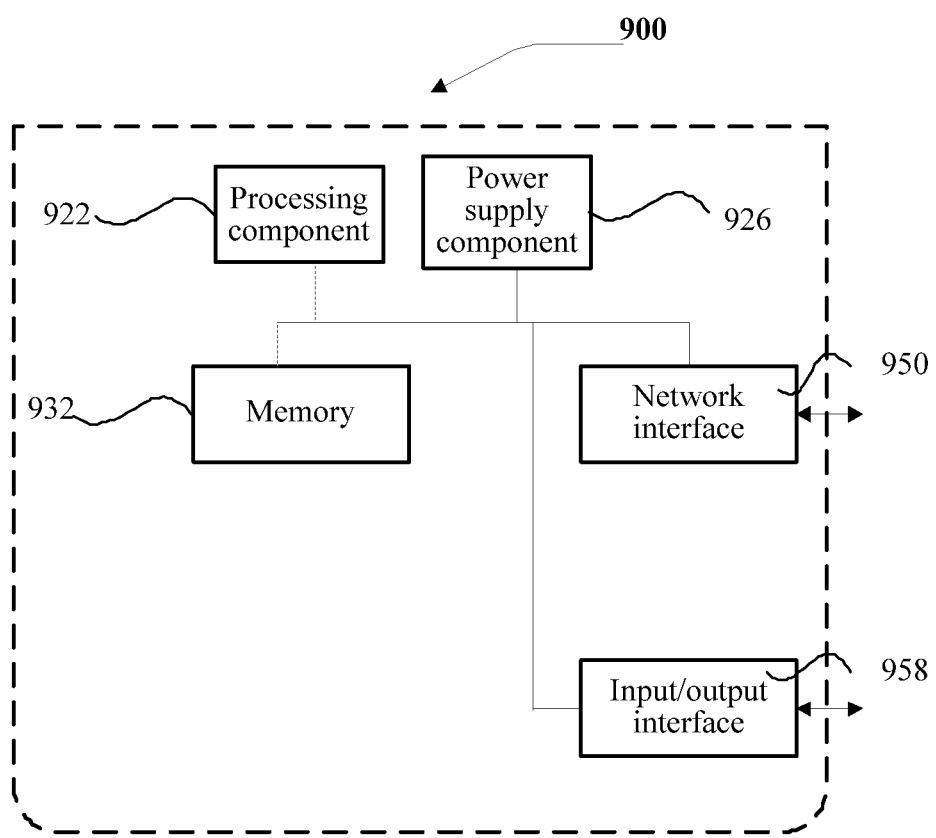
FIG. 9 is a block diagram of a lens barrel adjustment apparatus according to an embodiment of this application.

FIG. 9 is a block diagram of a lens barrel adjustment apparatus according to an embodiment of this application. For example, the apparatus 900 may be provided as VR glasses. Referring to FIG. 9, the apparatus 900 includes a processing component 922 that further includes one or more processors, and a memory resource represented by a memory 932, the memory resource being used for storing an instruction, for example, an application program, that can be executed by the processing component 922. The application program stored in the memory 932 may include one or more modules each corresponding to a set of instructions. In addition, the processing component 922 is configured to execute an instruction, to perform the method performed by the VR glasses in the foregoing lens barrel adjustment method embodiment.

The apparatus 900 may further include a power supply component 926, configured to perform power supply management of the apparatus 900, a wired or wireless network interface 950, configured to connect the apparatus 900 to a network, and an input/output (I/O) interface 958. The apparatus 900 may operate an operating system stored in the memory 932, for example, the Windows Server", the Mac OS X™, the Unix™, the Linux™, or the FreeBSD™.

A person of ordinary skill in the art may understand that all or some of the steps of the foregoing embodiments may be implemented by using hardware, or may be implemented by a program instructing relevant hardware. In the embodiments, the hardware may be implemented by dedicated hardware or hardware executing a machine-readable instruction. For example, the hardware may be a permanent circuit or logical device (for example, a dedicated processor, such as an FPGA or an ASIC) that is specially designed to perform particular operations. Alternatively, the hardware may include a programmable logical device or circuit (for example, including a general-purpose processor or another programmable processor) that is temporarily configured by software to perform particular operations. The program may be stored in a computer-readable storage medium. The storage medium mentioned above may be: a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. Virtual reality (VR) glasses, comprising:
a glasses body; and
two lens barrels that are symmetrically disposed within the glasses body, each lens barrel having a lens barrel body, a lens barrel kit, a lens mounted on the lens barrel body, and a display mounted on the lens barrel kit, the lens barrel kit being provided with a first adjustment component, and the lens barrel body being provided with a second adjustment component;

wherein for each lens barrel, the lens barrel kit and the lens barrel body are configured to perform relative movement through coordination of the first adjustment component and the second adjustment component; and each lens barrel kit of the two lens barrels is configured to be adjusted independently to move the respective display mounted on the respective lens barrel kit, vary a physical distance between the lens mounted on the barrel body and the display mounted on the lens barrel kit, and provide a respective imaging distance for reviewing respective VR content displayed on the display of the respective lens barrel;

wherein in each of the two lens barrels, the first adjustment component and the second adjustment component form a respective motor, the first adjustment including a first assembly attached to the respective lens barrel kit, the second adjustment component including a second assembly attached to the respective lens barrel body; and wherein the first and second assemblies are mechanically coupled to each other and configured to drive the respective lens barrel kit with respect to the lens barrel body, thereby moving the respective display mounted on the respective lens barrel kit with respect to the lens mounted on the lens barrel body.

2. The VR glasses according to claim 1, wherein the first adjustment component is a stator assembly of the motor, and the second adjustment component is a rotor assembly of the motor.

3. The VR glasses according to claim 1, further comprising: a lens barrel adjustment apparatus, wherein the lens barrel adjustment apparatus is configured to: obtain a scene type of a to-be-displayed image, determine, based on the scene type, a target distance between the display and the lens that correspond to each lens barrel, and control the first adjustment component and the second adjustment component to adjust the physical distance between the display and the lens to reach the target distance.

4. The VR glasses according to claim 3, wherein the lens barrel adjustment apparatus is configured to:
obtain the scene type of the to-be-displayed image through a scene type option of the VR glasses.

5. The VR glasses according to claim 3, wherein the lens barrel adjustment apparatus is configured to:
obtain a device type of an external device of the VR glasses; and
obtain the scene type of the to-be-displayed image based on the device type.

6. The VR glasses according to claim 3, wherein the lens barrel adjustment apparatus is configured to:
obtain scenario information provided by an external device of the VR glasses, and determine the scene type based on the scenario information.

7. The VR glasses according to claim 1, wherein the first adjustment component and the second adjustment component are provided with a plurality of levels through coordination, and different levels are used for indicating relative movement of the lens barrel body and the lens barrel kit by different distances, each of the plurality of levels being associated with a distinct predefined virtual reality scene type.

8. The VR glasses according to claim 1, wherein the first adjustment component comprises a pair of elastic clamping tenons that are symmetrically disposed; each elastic clamping tenon comprises a pressing portion and an elastic latching portion; the elastic latching portion extends out toward an inner wall of the lens barrel kit; and the pressing portion extends out toward an outer wall of the lens barrel kit; and the second adjustment component comprises a pair of clamping tracks; each clamping track corresponds to one elastic clamping tenon and is disposed along an axial direction of the lens barrel body; each clamping track is provided with a plurality of pairs of clamping slots along a radial direction of a cross section of the lens barrel body; and each pair of clamping slots is used for accommodating the elastic latching portion of the elastic clamping tenon.

9. The VR glasses according to claim 1, wherein a second end of the lens barrel body is provided with an annular light shielding structure, and the annular light shielding structure is in contact with an inner wall of the lens barrel kit.

10. A lens barrel adjustment method, implemented at virtual reality (VR) glasses having a glasses body and two lens barrels, the method comprising:
selecting a scene type from a plurality of predefined scene types including at least a 3D movie, a table game, a shoot game, and a social application;
determining, based on the selected scene type of a to-be-displayed image, a target distance between a display and a lens that correspond to each lens barrel of the VR glasses, the two lens barrels of the VR glasses being symmetrically disposed within the glasses body, each lens barrel comprising a lens barrel body, a lens barrel kit, a lens mounted on the lens barrel body, and a display mounted on the lens barrel kit, the lens barrel kit being provided with a first adjustment component, the lens barrel body being provided with a second adjustment component, the lens barrel kit and the lens barrel body of each lens barrel being capable of performing relative movement through coordination of the first adjustment component and the second adjustment component, wherein in each of the two lens barrels, the first adjustment component and the second adjustment component form a respective motor, the first adjustment including a first assembly attached to the respective lens barrel kit, the second adjustment component including a second assembly attached to the respective lens barrel body;
obtaining a current distance between the display and the lens that correspond to each lens barrel; and
in accordance with a determination that the current distance is not the same as the target distance, adjusting the first adjustment component and the second adjustment component in each lens barrel to make the first and second assemblies drive the respective lens barrel kit with respect to the respective lens barrel body, thereby moving the respective display mounted on the respective lens barrel kit with respect to the lens mounted on the lens barrel body to achieve the target distance between the display and the lens, wherein each of the two lens barrels is configured to be adjusted independently to vary a physical distance between the lens mounted on the barrel body and the display mounted on the lens barrel kit to the target distance and provide a respective imaging distance for reviewing respective VR content displayed on the display of the respective lens barrel according to the selected scene type.

11. The method according to claim 10, wherein the determining, based on a scene type of a to-be-displayed image, a target distance between the display and the lens that correspond to each lens barrel comprises:
determining, in a preset correspondence between a scene type and a distance between the display and the lens based on the scene type of the to-be-displayed image, a distance corresponding to the scene type of the to-be-displayed image, as the target distance.

12. The method according to claim 10, wherein the adjusting the first adjustment component and the second adjustment component to achieve the target distance between the display and the lens comprises:
determining target movement displacement based on the current distance and the target distance; and
controlling the first adjustment component and the second adjustment component to move the lens barrel kit or the lens barrel body by the target movement displacement.

13. The method according to claim 12, wherein the controlling the first adjustment component and the second adjustment component to move the lens barrel kit or the lens barrel body by the target movement displacement comprises:
determining a target level of the first adjustment component and the second adjustment component based on the target movement displacement; and
setting the first adjustment component and the second adjustment component to the target level through coordination, so that the lens barrel kit is moved by the target movement displacement.

14. The method according to claim 10, further comprising:
obtaining the scene type of the to-be-displayed image through a scene type option of the VR glasses; or
obtaining a device type of an external device of the VR glasses, and obtaining the scene type of the to-be-displayed image based on the device type; or
obtaining scenario information provided by an external device of the VR glasses, and determining the scene type based on the scenario information.

15. An apparatus, comprising:
a lens barrel adjustment apparatus including a processor; and memory including a non-transitory storage medium for storing one or more programs configured to be executed by the processor; and
reality (VR) glasses having a glasses body and two lens barrels that are symmetrically disposed within the glasses body, each lens barrel having a lens barrel body, a lens barrel kit, a lens mounted on the lens barrel body, and a display mounted on the lens barrel kit, the lens barrel kit being provided with a first adjustment component, the lens barrel body being provided with a second adjustment component, the lens barrel kit and the lens barrel body of each lens barrel being configured to perform relative movement through coordination of the first adjustment component and the second adjustment component;
wherein in each of the two lens barrels, the first adjustment component and the second adjustment component form a respective motor, the first adjustment including a first assembly attached to the respective lens barrel kit, the second adjustment component including a second assembly attached to the respective lens barrel body;
wherein the lens barrel adjustment apparatus is configured to be coupled to the VR glasses and the one or more programs stored on the memory of the lens barrel adjustment apparatus include instructions for:
selecting a scene type from a plurality of predefined scene types including at least a 3D movie, a table game, a shoot game, and a social application;
determining, based on the selected scene type of a to-be-displayed image, a target distance between the display and the lens that correspond to each lens barrel;
obtaining a current distance between the display and the lens that correspond to each lens barrel; and
in accordance with a determination that the current distance is not the same as the target distance, adjusting the first adjustment component and the second adjustment component in each lens barrel to make the first and second assemblies drive the respective lens barrel kit with respect to the respective lens barrel body, thereby moving the respective display mounted on the respective lens barrel kit with respect to the lens mounted on the lens barrel body to achieve the target distance between the display and the lens; and
wherein each of the two lens barrels of the VR glasses is configured to be adjusted independently to vary a physical distance between the lens mounted on the barrel body and the display mounted on the lens barrel kit to the target distance and provide a respective imaging distance for reviewing respective VR content displayed on the display of the respective lens barrel according to the selected scene type.

16. The apparatus according to claim 15, wherein the one or more programs further include instructions for determining, in a preset correspondence between a scene type and a distance between the display and the lens based on the scene type of the to-be-displayed image, a distance corresponding to the scene type of the to-be-displayed image, as the target distance.

17. The apparatus according to claim 15, wherein the one or more programs further include instructions for:
determining target movement displacement based on the current distance and the target distance; and
controlling the first adjustment component and the second adjustment component to move the lens barrel kit or the lens barrel body by the target movement displacement.

18. The apparatus according to claim 17, wherein the one or more programs further include instructions for:
determining a target level of the first adjustment component and the second adjustment component based on the target movement displacement; and
setting the first adjustment component and the second adjustment component to the target level through coordination, so that the lens barrel kit or the lens barrel body is moved by the target movement displacement.

19. The apparatus according to claim 15, wherein the one or more programs further include instructions for:
obtaining the scene type of the to-be-displayed image through a scene type option of the VR glasses; or
obtaining a device type of an external device of the VR glasses, and obtain the scene type of the to-be-displayed image based on the device type; or
obtaining scenario information provided by an external device of the VR glasses, and determine the scene type based on the scenario information.

* * * * *